United States Patent
Frankel et al.

(10) Patent No.: US 10,200,305 B2
(45) Date of Patent: Feb. 5, 2019

(54) STRUCTURED REARRANGED NETWORK FOR DATA CENTER AND HIGH-PERFORMANCE COMPUTING APPLICATIONS

(71) Applicant: Ciena Corporation, Hanover, MD (US)

(72) Inventors: Michael Y. Frankel, Bethesda, MD (US); Vladimir Pelekhaty, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 99 days.

(21) Appl. No.: 15/338,929

(22) Filed: Oct. 31, 2016

(65) Prior Publication Data

US 2018/0123980 A1    May 3, 2018

(51) Int. Cl.
*H04L 12/933* (2013.01)
*H04L 12/947* (2013.01)
*H04Q 11/00* (2006.01)

(52) U.S. Cl.
CPC .............. *H04L 49/15* (2013.01); *H04L 49/25* (2013.01); *H04Q 11/00* (2013.01); *H04Q 11/0003* (2013.01); *H04Q 11/0005* (2013.01); *H04Q 2011/0052* (2013.01)

(58) Field of Classification Search
CPC .................................. H04L 49/15; H04L 49/25
See application file for complete search history.

(56) References Cited

U.S. PATENT DOCUMENTS

| | | | |
|---|---|---|---|
| 8,054,840 B2 | 11/2011 | Booth et al. | |
| 9,124,383 B1 | 9/2015 | Frankel et al. | |
| 2008/0075071 A1 | 3/2008 | Beshai | |
| 2011/0064086 A1* | 3/2011 | Xiong | H04L 49/351 370/401 |
| 2011/0243136 A1* | 10/2011 | Raman | H04L 45/60 370/392 |
| 2013/0108259 A1 | 5/2013 | Srinivas et al. | |
| 2013/0108263 A1 | 5/2013 | Srinivas et al. | |
| 2013/0108264 A1 | 5/2013 | deRuijter et al. | |
| 2013/0117449 A1 | 5/2013 | Hares et al. | |

(Continued)

OTHER PUBLICATIONS

Singla et al., "Jellyfish: Networking Data Centers Randomly," arXiv:1110.1687v3 [cs.NI] Apr. 20, 2012.

(Continued)

*Primary Examiner* — Feben Haile
(74) *Attorney, Agent, or Firm* — Clements Bernard Walker PLLC; Christopher L. Bernard; Lawrence A. Baratta, Jr.

(57) ABSTRACT

A data center network utilizing a single layer architecture includes a plurality of switches each with a plurality of ports including a first set of ports of the plurality of ports including network facing ports and a second set of ports of the plurality of ports including server facing ports; and a plurality of optical reshufflers configured to randomly interconnect the plurality of switches via the network facing ports of each in a single layer, unstructured network based on a plurality of structural constraints. The value of a number of the network facing ports is equal or greater than a number of the server facing ports and wherein each of the plurality of switches is a switch with attached servers. The plurality of optical reshufflers can be spatially partitioned across a layer with each optical reshuffler restricted to internal connectivity.

20 Claims, 15 Drawing Sheets

(56) References Cited

U.S. PATENT DOCUMENTS

| | | |
|---|---|---|
| 2013/0287397 A1 | 10/2013 | Frankel et al. |
| 2013/0322443 A1 | 12/2013 | Dunbar et al. |
| 2014/0153924 A1 | 6/2014 | deRuijter |
| 2014/0229944 A1 | 8/2014 | Wang et al. |
| 2014/0270762 A1 | 9/2014 | Li et al. |
| 2015/0076923 A1 | 3/2015 | Frankel et al. |
| 2017/0187629 A1* | 6/2017 | Shalev ................ H04L 43/0823 |

OTHER PUBLICATIONS

Jyothi et al., "Measuring and Understanding Throughput of Network Topologies," arXiv:1402.2531v3 [cs.NI] Feb. 9, 2015.

Farrington et al., Helios: A Hybrid Electrical/Optical Switch Architecture for Modular Data Centers, SIGCOMM'10, Aug. 30-Sep. 3, 2010, New Delhi, India. Copyright 2010 ACM 978-1-4503-0201—Feb. 10, 2008.

Broadcom, HighDensity 25/100 Gigabit Ethernet StrataXGS® Tomahawk Ethernet Switch Series BCM56960 Series, accessed Oct. 21, 2015.

Koibuchi et al., "Layout-conscious Random Topologies for HPC Off-chip Interconnects," The 19th International Symposium on High-Performance Computer Architecture (HPCA), Feb. 2013.

Doyle, "Lessons from Altoona: What Facebook's newest data center can teach us," Network World (http://www.networkworld.com/) on Apr. 14, 2015.

Calient, "LightConnect™ Fabric Virtual Pod Data Centers," http://www.calient.net/solutions/lightconnectfabricvirtualpod-datacenters/, accessed Oct. 21, 2015.

* cited by examiner

FIG. 16

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| R1 | 1 | 2 | 3 | 4 | 5 | 6 | 7 | 8 | 9 | 10 | 11 | 12 | 13 | 14 | 15 | 16 |
| R2 | 1 | 4 | 7 | 10 | 13 | 16 | 3 | 6 | 9 | 12 | 15 | 2 | 5 | 8 | 11 | 14 |
| R3 | 1 | 6 | 11 | 16 | 5 | 10 | 15 | 4 | 9 | 14 | 3 | 8 | 13 | 2 | 7 | 12 |
| R4 | 1 | 8 | 15 | 6 | 13 | 4 | 11 | 2 | 9 | 16 | 7 | 14 | 5 | 12 | 3 | 10 |
| R5 | 16 | 15 | 14 | 13 | 12 | 11 | 10 | 9 | 8 | 7 | 6 | 5 | 4 | 3 | 2 | 1 |
| R6 | 14 | 11 | 8 | 5 | 2 | 15 | 12 | 9 | 6 | 3 | 16 | 13 | 10 | 7 | 4 | 1 |
| R7 | 12 | 7 | 2 | 13 | 8 | 3 | 14 | 9 | 4 | 15 | 10 | 5 | 16 | 11 | 6 | 1 |
| R8 | 10 | 3 | 12 | 5 | 14 | 7 | 16 | 9 | 2 | 11 | 4 | 13 | 6 | 15 | 8 | 1 |

30

STRUCTURED REARRANGED NETWORK FOR DATA CENTER AND HIGH-PERFORMANCE COMPUTING APPLICATIONS

FIELD OF THE DISCLOSURE

The present disclosure generally relates to networking systems and methods. More particularly, the present disclosure relates to a structured rearranged network architecture for data center and High-Performance Computing applications which describe a random graph network and mechanism for implementation.

BACKGROUND OF THE DISCLOSURE

Conventionally, networks in data centers, High Performance Computing (HPC), and the like are built with rigidly structured architectures. Some examples known in data center networks are Fat Tree (Clos), Dragonfly, Slim Fly, and B-Cube. Specifically, a Fat Tree or Clos network is frequently used in modern data centers. This structured network architecture is easy to visualize, can be built from smaller building blocks, provides high bisectional bandwidth, etc. Further, the number of hops is at most 4 in a 3-layer network, traffic is easily routed with Equal-Cost Multi-Path routing (ECMP) and is resilient to failure, and network can be scaled further at the cost of additional layers. At the same time, structured networks suffer from some well-known problems. First, there is increased latency due to many hops, especially as the number of layers grows with structured network architectures. High network loads can produce filled switch buffers, increasing latency. Second, structured network architectures are deployed in discrete implementation sizes, and higher layer ports may go unused in an underfilled network. FIG. 1 illustrates an exemplary three-layer leaf-spine folded-Clos network 10 with various switches 12 interconnecting servers 14. Of note, the Clos network 10 is used to draw comparisons with the systems and methods described herein. As an example, with the three-layer (L=3) Clos network 10 using k-port switch, the following relationships between port count and server and switch counts exist: k=24→servers=3456, switches=720; k=32→servers=8192, switches=1280; k=64→servers=65536, switches=5120. For Fat Tree Computations (k-port switches, L switching layers): the number of layers required: $L=\log(N_{serv}/2)/\log(k/2) \sim \log(N_{serv})/\log(k)$; the number of servers: $N_{serv}=k*(k/2)*(k/2) \ldots = 2*(k/2)^L$. The total switch count is: $N_{switch}=(2L-1)*(k/2)^{(L-1)}$.

Third, structured network architectures have difficulty in horizontal scaling by requiring multiple layers. Horizontal scaling is explained as follows. In general, hardware devices such as Application Specific Integrated Circuits (ASICs) are port limited by available pins. This means bandwidth can increase, but usually, most increases are achieved by increasing port speeds such as 25G to 56G, i.e., port counts are difficult to increase. However, port counts determine horizontal fan-out capability such as in the Clos network 10. Therefore, network horizontal scale growth will eventually face problems in terms of network layer increases. Each layer requires interconnect, which requires high power backplanes and/or expensive optics. Fourth, structured network architectures are susceptible to cluster-packing problems which confine jobs within clusters reducing latency and improving efficiency. However, the processor (CPU), storage, etc. resources in the cluster must then be sized to anticipate large loads which can often be underutilized.

In contrast to structured network architectures, a purely random approach, while overcoming some of the aforementioned disadvantages, has issues in construction, maintenance, and management. First, a single randomizer device (for an entire network) is difficult to construct, manage, and repair. Second, there are requirements to preserve randomized interconnection, but also allow spatial separation for data center reliability. Third, fiber cabling is unmanageable, and finally, fourth, random networks are difficult to visualize and administer.

BRIEF SUMMARY OF THE DISCLOSURE

In an exemplary embodiment, a data center network utilizing a single layer architecture includes a plurality of switches each with a plurality of ports including a first set of ports of the plurality of ports including network facing ports and a second set of ports of the plurality of ports including server facing ports; and a plurality of optical reshufflers configured to randomly interconnect the plurality of switches via the network facing ports of each in a single layer, unstructured network based on a plurality of structural constraints. A number of the network facing ports is equal or greater than a number of the server facing ports and wherein each of the plurality of switches is a switch with attached servers. The plurality of optical reshufflers can be spatially partitioned across a layer with each optical reshuffler restricted to internal connectivity. The network facing ports for an associated number of hops, h, for reachability between the plurality of switches, #TOR, and with server throughput oversubscription s:1, is selected based on: #TOR<s*n*(n−1)^(h−1), n being a number of the network facing ports. The plurality of structural constraints can include a group of ports of the network facing ports of a switch is only used to connect the switch to a neighbor such that two or more groups of ports are not used for the neighbor at full capacity. The plurality of structural constraints can include, when making connections, preference is provided to a pair of switches with a worst reachability including yet unreached switches.

The plurality of switches and the plurality of optical reshufflers can be located in separate racks in a data center and groups of the plurality of switches are connected to the plurality of optical reshufflers via a structured multi-fiber cable. The data center network can further include a Clos network including a plurality of switches in a layered structured, wherein the plurality of switches and the plurality of optical reshufflers are added in the Clos network for upgrade thereof. The data center network can further include a packet switch for external Wide Area Network connectivity, wherein the packet switch replaces one of the plurality of optical reshufflers and a group of the plurality of switches. Groups of the network facing ports can be aggregated in Port Aggregation Groups which are routed together. At less than full fill of the plurality of optical reshufflers with associated switches connected thereto, unequipped ports on the plurality of optical reshufflers can be cabled back on themselves to bridge a gap where a switch resides at a larger fill.

In another exemplary embodiment, a method in a data center network utilizing a single layer architecture includes providing a plurality of switches each with a plurality of ports including a first set of ports of the plurality of ports including network facing ports and a second set of ports of the plurality of ports including server facing ports; and providing a plurality of optical reshufflers configured to randomly interconnect the plurality of switches via the network facing ports of each in a single layer, unstructured network based on a plurality of structural constraints. A number of the network facing ports n is greater than a number of the server facing ports and wherein each of the plurality of switches is a switch with attached servers. The plurality of optical reshufflers can be spatially partitioned across a layer with each optical reshuffler restricted to internal connectivity. The network facing ports for an associated number of hops, h, for reachability between the plurality of switches, #TOR, and with server throughput oversubscription s:1, is selected based on: #TOR<s*n*(n−1)^(h−1), n being a number of the network facing ports. The plurality of structural constraints can include a group of ports of the network facing ports of a switch is only used to connect the switch to a neighbor such that two or more groups of ports are not used for the neighbor at full capacity. The plurality of structural constraints can include, when making connections, preference is provided to a pair of switches with a worst reachability including yet unreached switches. The plurality of switches and the plurality of optical reshufflers can be located in separate racks in a data center and groups of the plurality of switches are connected to the plurality of optical reshufflers via a structured multi-fiber cable.

In a further exemplary embodiment, a structured random network for data center and high performance computing applications includes a plurality of optical reshufflers configured to randomly interconnect a plurality of switches via network facing ports of each in a single layer, unstructured network based on a plurality of structural constraints, wherein the plurality of structural constraints include a single group of ports of the network facing ports of a switch is only used to connect the switch to a neighbor such that two or more groups of ports of the network facing ports are not used for the neighbor, at full capacity, and, when making connections, preference is provided to a pair of switches with a worst reachability including yet unreached switches. The plurality of optical reshufflers can be spatially partitioned across a layer with each optical reshuffler restricted to internal connectivity.

BRIEF DESCRIPTION OF THE DRAWINGS

The present disclosure is illustrated and described herein with reference to the various drawings, in which like reference numbers are used to denote like system components/method steps, as appropriate, and in which:

FIG. 16 is a diagram of a matrix of sequential blocks of TOR switches.

DETAILED DESCRIPTION OF THE DISCLOSURE

Again, in various exemplary embodiments, the present disclosure relates to a structured rearranged network architecture for data center and High-Performance Computing applications which describe a random graph network and mechanism for implementation. The structured rearranged (STRAT) network architecture can utilize one or more optical reshufflers which randomly interconnect switches and servers into a semi-structured random network architecture. As described herein, the structured rearranged network architecture has advantages over the structured network architectures (e.g., Fat Tree (Clos), Dragonfly, Slim Fly, and B-Cube) in higher throughput, lower latency, flexibility for traffic patterns, expansion and extendability, support for new technology, and overall link count. The objective of the structured rearranged network architecture systems and methods described herein is to overcome the aforementioned limitations of purely random networks, namely semi-structured reshufflers, fiber and cabling manageability, and overall management and visualization. The structured rearranged network architecture configures more network-facing ports (facing other switches) as opposed to server-facing ports. This contrasts with the structured network architectures which dedicates more ports as server-facing.

Example Structured Rearranged Network Architecture

Figure 2:
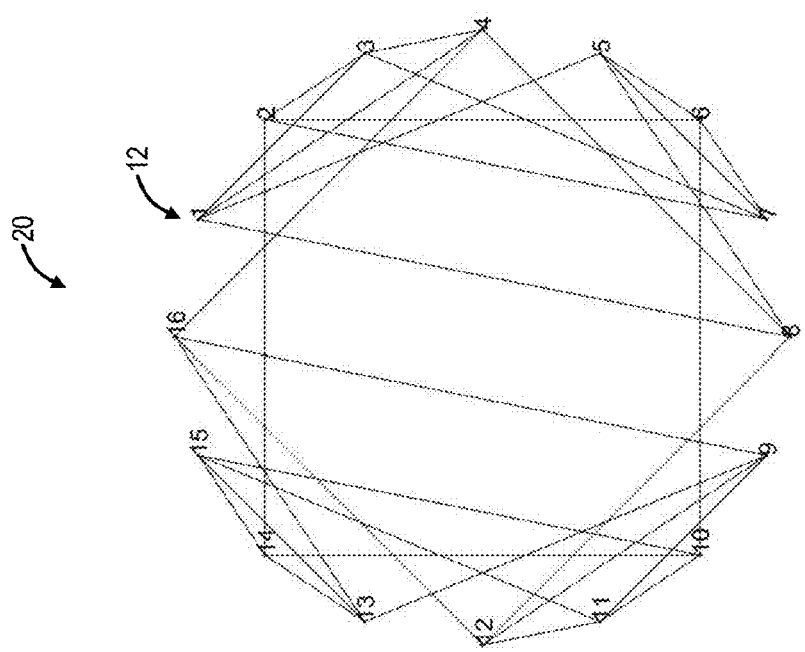
FIG. 2 is a network diagram of an exemplary structured rearranged network with sixteen switches interconnected to one another with substantially random 4-way connections.

Referring to FIG. 2, in an exemplary embodiment, a network diagram illustrates an exemplary structured rearranged network 20 with sixteen switches 12 interconnected to one another. Note, the structured rearranged network 20 omits the servers 14 for illustration purposes, but those of ordinary skill in the art understand that each of the sixteen switches 12 can include one or more servers 14 connected thereto. The structured rearranged network 20 architecture changes the approach such that all of the switches 12 are actually Top of Rack switches (TORs) and have servers 14 attached. Unlike existing approaches in the structured network architectures, there are no switches 12 which serve a purely network interconnect function in the structured rearranged network 20 architecture, i.e., there is no aggregation or spine layer in the structured rearranged network 20 architecture. Each TOR switch 12 has a number of ports which face towards other TOR switches 12 in the network 20. The interconnection between TOR switches 12 is established in a uniform random, but non-repeating manner (i.e., each TOR switch 12 is connected to one other TOR switch 12 by not more than a single port). A visually tractable example of 16 TOR switches 12 with five network ports is shown in FIG. 2. Again, note each TOR switch 12 will have additional ports for server connections, but these are not shown.

Real data center networks may have hundreds, or even many thousands of such TOR switches 12. It may not be intuitively obvious, but the structured rearranged network 20 architecture is known to be much more efficient in operating with less hardware, providing higher throughput, and achieve lower latency than structured network architectures, such as Clos, Dragonfly, B-cube, etc. This is described in Sangeetha Abdu Jyothi et al., "Measuring and Understanding Throughput of Network Topologies," Feb. 11, 2014, and available at arxiv.org/abs/1402.2531v3; Ankit Singla et al., "Jellyfish: Networking Data Centers Randomly," Oct. 8, 2011, and available at arxiv.org/abs/1110.1687; and Henry Casanova et al., "Layout-conscious Random Topologies for HPC Off-chip Interconnects," 2013 IEEE 19th International Symposium on High Performance Computer Architecture (HPCA2013), the contents of each of the foregoing are incorporated by reference herein.

For example, if the TOR switches 12 have 16 network-facing ports, then each TOR switch 12 can reach 16 neighbors in one hop, a maximum of 240 TOR switches 12 in two hops, a maximum of 3600 TOR switches 12 in three hops, a maximum of 54000 TOR switches 12 in four hops, etc. In contrast, the Clos network 10 topology requires at least two hops for two layers, and four hops for three-layers.

The advantages of single-layer, structured rearranged architectures are enumerated as follows. The structured rearranged network 20 architecture can use commercial, off-the-shelf components, such as switch ASICs, pluggable optical modules, etc.—no custom electronic hardware developments are needed. The structured rearranged network 20 architecture is a completely delayered, flat network. The structured rearranged network 20 architecture has higher throughput and much fewer hops (five or lower) with high diverse path count (simulation details are presented herein), relative to the structured network architectures. Also, the structured rearranged network 20 architecture can achieve fewer optical links and switches, i.e., reduced hardware at fixed throughput (simulation details are presented herein), relative to the structured network architectures.

The structured rearranged network 20 architecture exhibits, in deployment and rollout, a smooth, continuous trade-off between hardware cost and throughput (no large discrete increments in hardware or cost). The structured rearranged network 20 architecture is easily scalable, i.e., new server and switch insertion is simple, even with different port counts and technologies. As well, the structured rearranged network 20 architecture requires payment and deployment of only the servers 14 being used, i.e., no underutilized centralized fabric. The structured rearranged network 20 architecture ports can be aggregated into a few large bundles, improving optical transceiver cost and front-panel density, e.g., typically 16 distinct port bundles is sufficient. In contrast, Clos scalability requires very large port fan-out to realize large network East-West scalability (horizontal). The structured rearranged network 20 architecture substantially increases resilience to failure through richer interconnects and through workload spread across the full data center, relative to the structured network architectures. Finally, the structured rearranged network 20 architecture is a fully packetized approach.

However, such single-layer, unstructured networks in the structured rearranged network 20 architecture have several known problems: 1) cabling across a large set of TOR switches 12 is very difficult or nearly impossible; 2) providing a way to gracefully handle partial data center failure does not exist; and 3) there are no easy approaches to manufacture and operate optical interconnection patch panels.

In various exemplary embodiments, the systems and methods described herein provide solutions to the aforementioned problems, preserving all the previously enumerated advantages of a single-layer, unstructured network. For ease of illustration, the foregoing descriptions illustrate the systems and methods considering a small network. However, the same approach can be applied to large data centers (hundreds of thousands of servers and thousands of switches).

In the structured rearranged network 20 architecture, the reachability of the TOR switches 12 is a function of a number of hops as follows:

$$\#TORs < \#ports * (\#ports - 1)^{(\#hops - 1)}$$

In an example with 16 TOR switches 12 and two hops maximum, the structured rearranged network 20 architecture requires ~5 ports per TOR switch 12. With 4096 TOR switches 12 and maximum four hops, the structured rearranged network 20 architecture requires ~16 ports per TOR switch 12. The average number of hops is also about equivalent to the ratio of network bandwidth to server bandwidth at a TOR switch 12, assuming no oversubscription.

Note, in the various descriptions herein, reference is made to port counts of the TOR switches 12 and the total number of ports is segmented between network facing ports and server facing ports. Those of ordinary skill in the art will recognize that the network 20, with hundreds or thousands of switches, can include various different types of TOR switches 12, i.e., different vendors, different port counts, different numbers of network facing ports and/or server facing ports, etc.

Implementation of the systems and methods is realized by one or more optical reshufflers which enable the structured rearranged network 20 architecture without the aforementioned problems. The one or more optical reshufflers optically interconnect the TOR switches 12 maintaining the random interconnections. The systems and methods for the structured rearranged network 20 architecture include two structural constraints. For structural constraint #1, in order to improve network connection diversity and reachability, the systems and methods have a requirement that only a single Port Aggregation Group (PAG) is used to connect a TOR switch 12 to each neighbor (i.e., two or more PAGs should not be used for same nearest-neighbor connectivity). A PAG is described herein and includes a plurality of ports from a TOR switch 12 combined to a same location. The PAG is one mechanism to reduce fanout and cabling in the network 20. Note, the structural constraint #1 may not be achieved at low fills, i.e., when the network 20 is low fill. For structural constraint #2, in order to further maximize diversity between TOR switches 12, while making connections, preference might be given to a pair of TOR switches 12 with worst reachability including yet unreached.

Optical Reshufflers

Figure 3:
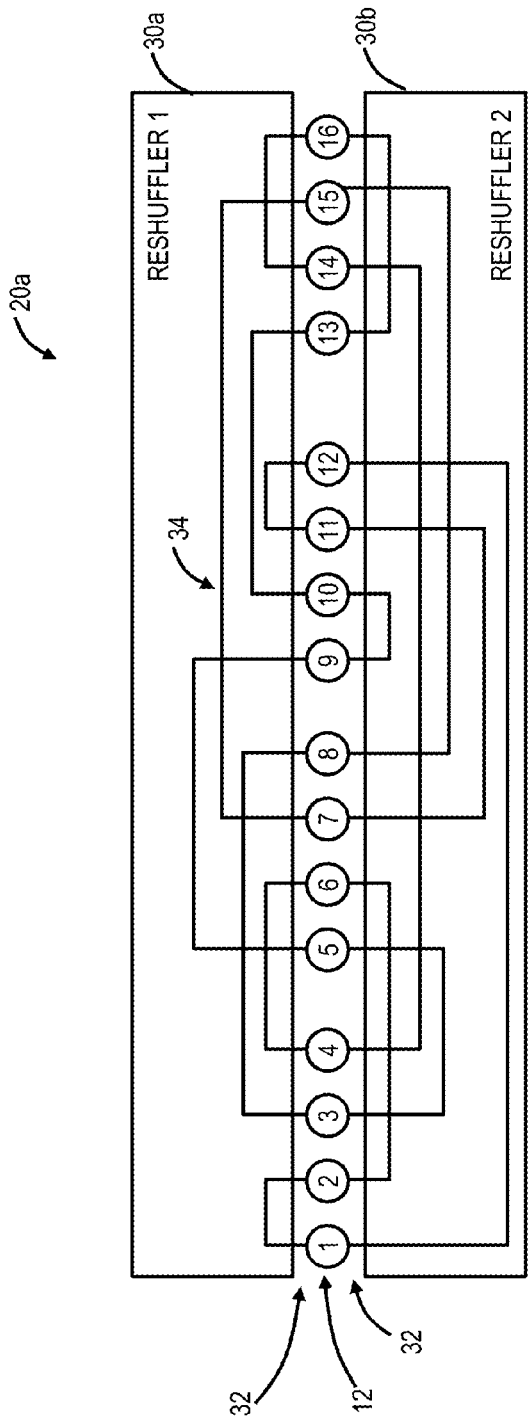
FIGS. 3 and 4 are a block diagram (FIG. 3) and a logical diagram (FIG. 4) of a structured rearranged network realized with optical reshufflers.
Figure 4:
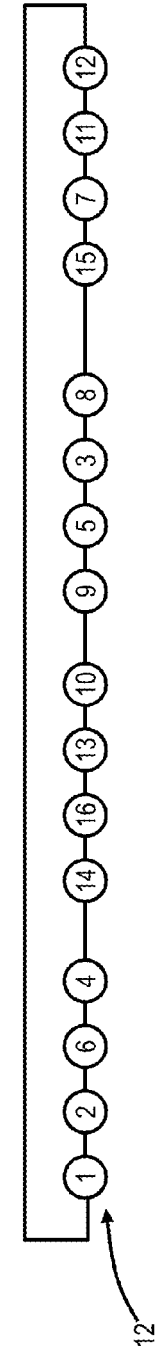

Referring to FIGS. 3 and 4, in an exemplary embodiment, a block diagram (FIG. 3) and a logical diagram (FIG. 4) illustrates a structured rearranged network 20a realized with optical reshufflers 30 (labeled as reshufflers 30a, 30b). As described herein, the optical reshufflers 30 are passive modules, such as rack-mounted modules, with various ports 32 and internal connectivity 34 between the ports 32. Of note, the various diagrams herein for the optical reshufflers 30 show single lines of connectivity, but those of ordinary skill in the art will recognize each port 32, and the connectivity 34 is bidirectional, namely two fibers for transmit (TX) and receive (RX). The objective of the optical reshufflers 30 is to maintain some structure to the otherwise unstructured connectivity in the structured rearranged network 20a, which is a random network from a connectivity perspective. The optical reshufflers 30 enforce the structural constraints #1 and #2 and provide cabling reduction as described herein. Further, the internal connectivity 34 is within a housing in the optical reshufflers 30 thereby removing random cabling in actual data center implementations.

The structured rearranged network 20a has 16 example TOR switches 12, labeled 1-16, each with two ports 32 shown. Of course, the TOR switches 12 include additional ports, such as for expansion and for connectivity to servers 14 (not shown). Upward bound ports 32 (e.g., labeled port 1 of each TOR switch 12) make pairwise connections within a domain of the optical reshuffler 30a and, similarly, downward bound ports (e.g., labeled port 2 of each TOR switch 12) make pairwise connections within a domain of the optical reshuffler 30b. Note, the internal connectivity 34 should be different for the optical reshufflers 30a, 30b.

Inspecting FIG. 3, it can be seen that it is functionally equivalent to reshuffling the TOR switches 12 around a closed chain with two next-neighbor connections. This is in full accordance with the graph theory, which states that the only connected graph of degree two is a cycle. Note that the TOR switches 12 are physically fixed elements, and they only appear to move due to the interconnection pattern provided by the optical reshufflers 30a, 30b. Moreover, the reshuffled cycle as it appears in FIG. 3 is fully identical to the monotonous one, where the TOR switches 12 are connected in accordance with their consecutive numbers, as can be proven by simply renumbering them. So, even the cycle type network 20a in FIG. 3 is reshuffled, it can be just as well be monotonous for the sake of simplicity. FIG. 4 illustrates a virtual (logical) view of the reshuffled connectivity of the 16 TOR switches 12.

Provided there are more than two ports 32 per TOR switch 12, each of the additional sets of ports 32 can be similarly pairwise interconnected within their corresponding optical reshufflers 30, just like first and second sets of ports 32 in FIG. 3. The structural constraint #1 is automatically satisfied by maintaining the uniqueness of the connected pairs of the TOR switches 12. For example, the third port of TOR switch 12 #1 can be connected to any unconnected TOR switch 12 except #2 and #12; the third port of the TOR switch 12 #2 can be connected to any unconnected TOR switch 12 except #1 and #6; the third port of TOR switch 12 #3 can be connected to any unconnected TOR switch 12 except #5 and #8, etc. Again, the optical reshufflers 30 can be fully passive optical patch panels. The optical reshufflers 30 be spatially removed from the TOR switches 12 and located in spatially diverse areas of the data center for failure resilience.

Figure 5:
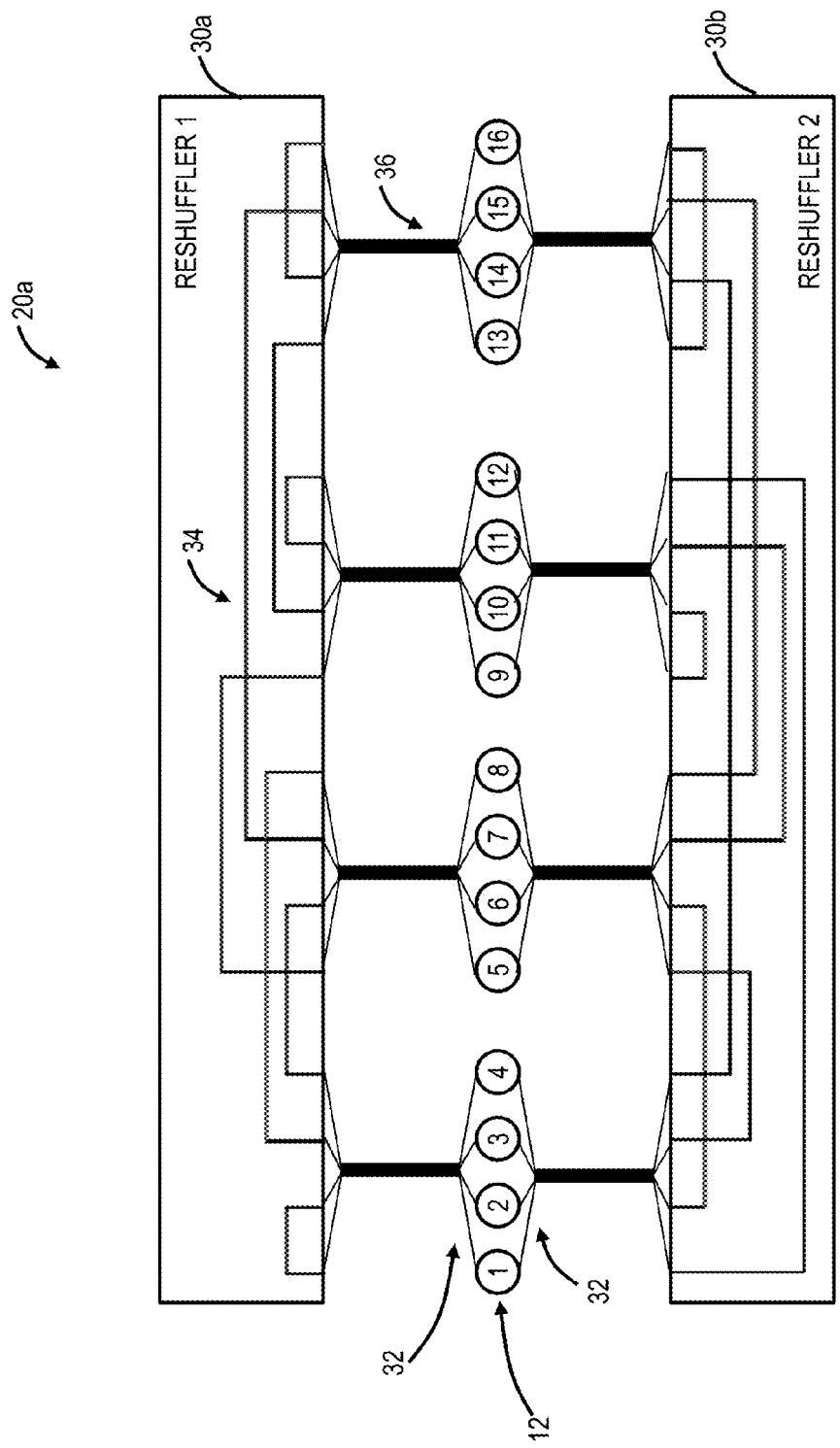
FIG. 5 is a block diagram of the structured rearranged network of FIG. 3 realized with the optical reshufflers and structured multi-fiber cables.

Referring to FIG. 5, in an exemplary embodiment, a block diagram illustrates the structured rearranged network 20a realized with optical reshufflers 30 and structured multi-fiber cables 36. Further, groups of TOR switches 12 can be connected to a local patch panel, with a structured multi-fiber cable providing long-distance connection to a corresponding patch panel at the optical reshuffler 30. The structured multi-fiber cables 36 include multiple fibers in a single cable allowing a reduction in the number of cables between sets of the TOR switches 12 and the optical reshufflers 30. In this example, each of the structured multi-fiber cables 36 supports a total of four ports (e.g., 8 fibers bundled in the structured multi-fiber cables 36). Of course, other embodiments are also contemplated. The structured multi-fiber cables 36 include a multi-port connector to the optical reshufflers 30, and the TOR switches 12. In an exemplary embodiment, the multi-port connector can terminate on a patch panel located proximate to the TOR switches 12 for individual cabling to the respective TOR switches 12. The multi-port connector can terminate directly on the optical reshufflers 30 or to a patch panel located proximate to the optical reshufflers 30.

Figure 6:
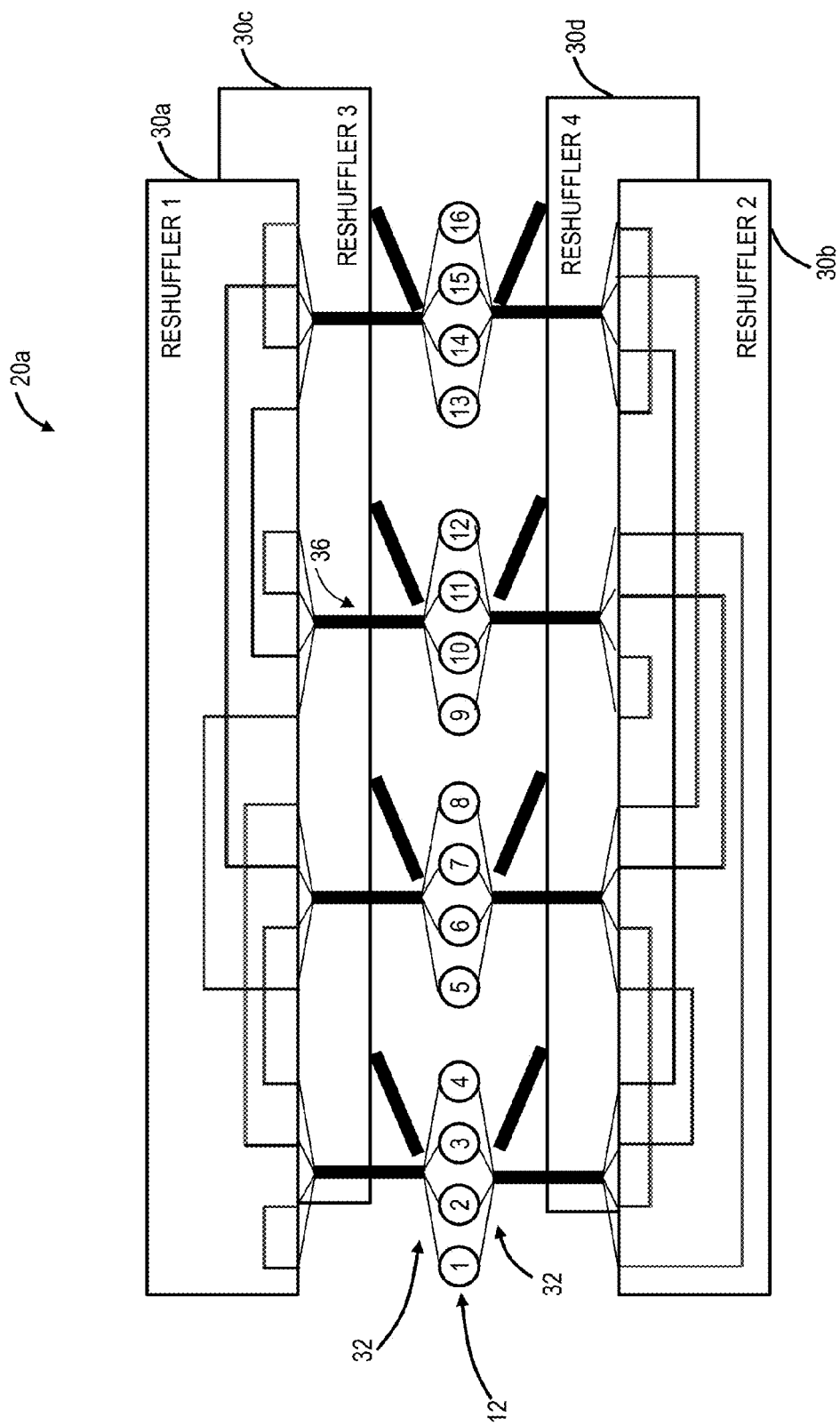
FIG. 6 is a block diagram of the structured rearranged network FIG. 3 with complete reshuffling connectivity via optical reshufflers.

Referring to FIG. 6, in an exemplary embodiment, a block diagram illustrates the structured rearranged network 20a with complete reshuffling connectivity via optical reshufflers 30 (labeled as optical reshufflers 30a, 30b, 30c, 30d). In the example of the structured rearranged network 20a with 16 TOR switches 12, as described herein, network interconnection requires four ports per TOR switch 12. Therefore, the structured rearranged network 20a requires four connection optical reshufflers 30a, 30b, 30c, 30d, which can be conveniently arranged in two separate cycles (but this is not required). There is a separate optical reshuffle 30 (in this case four total optical reshufflers 30a, 30b, 30c, 30d) for each set of network facing TOR switch ports, resulting in spatial structuring of the network interconnection infrastructure. That is, there are as many optical reshufflers 30 as there is network facing TOR switch ports.

Figure 7:
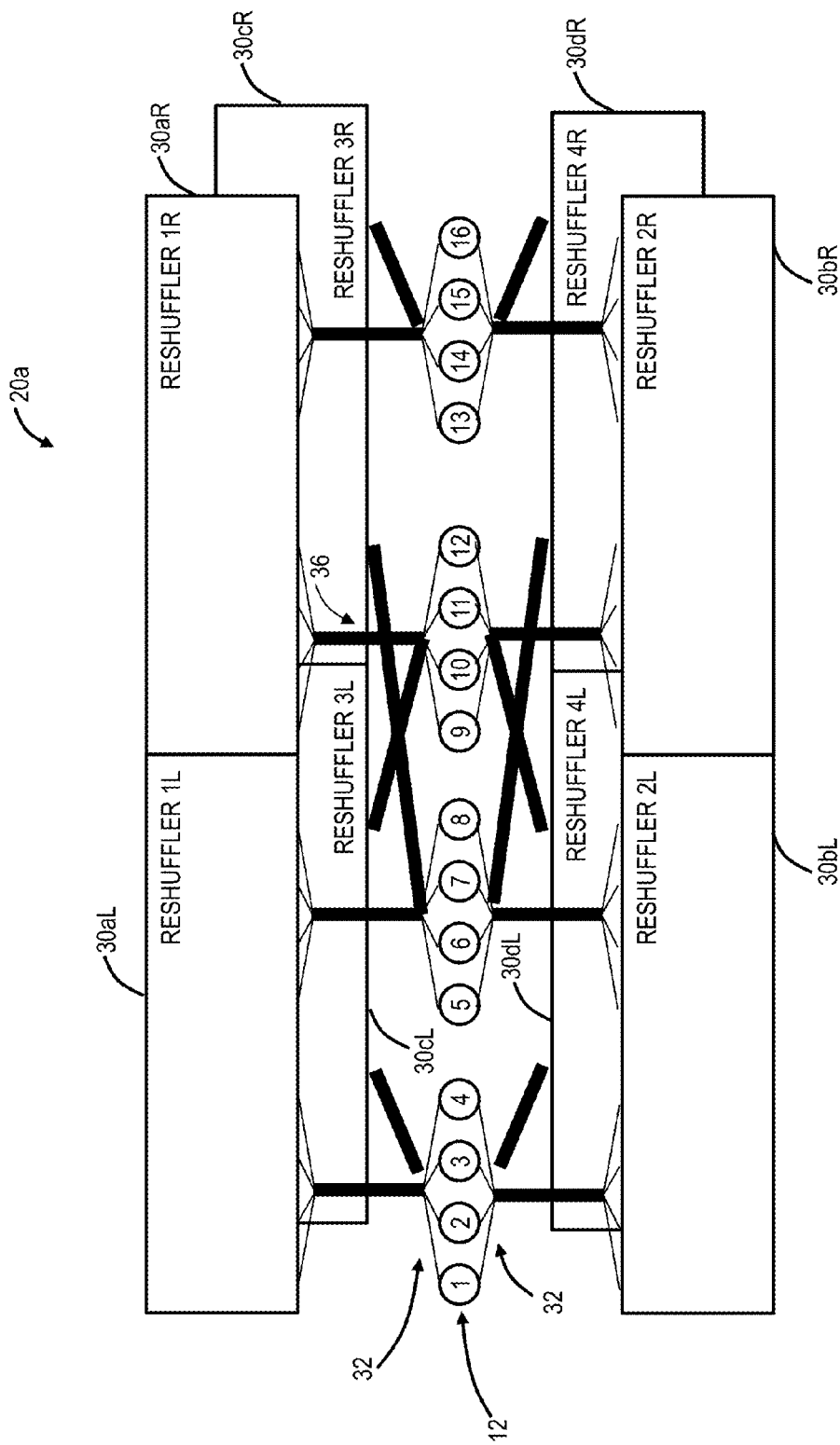
FIG. 7 is a block diagram of the structured rearranged network of FIG. 3 with complete reshuffling connectivity via split optical reshufflers.

Referring to FIG. 7, in an exemplary embodiment, a block diagram illustrates the structured rearranged network 20a with complete reshuffling connectivity via partitioning optical reshufflers 30 into sub-reshufflers (labeled as optical reshufflers 30aR, 30aL, 30bR, 30bL, 30cR, 30cL, 30dR, 30dL, R and L standing for "Right" and "Left" partition). As data center TORs switch 12 counts scale, an additional problem becomes visible. For example, assume 4096 TOR switches 12 for a typical cloud provider size data center. In this case, each optical reshuffler 30 would require at least 4096 ports (inputs and outputs), implying the number of fibers is a multiple of 4096 if a port is composed of multiple fibers. An optical reshuffler 30 of this size would be extremely difficult to build, and nearly impossible to repair. Taking an optical reshuffler 30 of such large size off-line for repairs would severely impact network performance.

Accordingly, the systems and methods apply a further innovation to make the optical reshufflers 30 buildable in practice, easily manageable, field replaceable, etc. A simple partitioning of a large optical reshufflers 30 into smaller partial reshufflers would not work, as there are many connections that would require crossing the partial reshufflers boundary. Instead, the total amount of TOR switches 12 can be split into several portions which are in turn connected to the smaller optical reshufflers 30. The optical reshuffler 30 connectivity is restricted to be inside the module. In this way, the optical reshufflers 30 are physically smaller and easier to build. Each optical reshuffler 30 can be removed and replaced, without introducing substantial network throughput penalty, etc. FIG. 7 illustrates this concept with the case where the optical reshuffler 30 modules are labeled as left (indicated L) and right (indicated R) reshufflers, each half size of the original full-fledged optical reshufflers 30. Each of the smaller optical reshufflers 30 (L and R) is used with half of the total amount of TOR switches 12. Also, the cross-over between the L and R optical reshufflers 30 occurs between the TOR switches 12 #5 through #12. Again, while this is illustrated in a 16 TOR switch 12 configuration, those of ordinary skill in the art will recognize this can equally apply to a much larger network.

In a similar manner, the original full-fledged optical reshufflers 30 may be split into 4, 8, 16, etc. smaller ones each reshuffling $1/4^{th}$, $1/8^{th}$, $1/16^{th}$, etc. of the total amount of TOR switches 12.

There are switching ASICs with 64 ports and more, allowing for up to as many connections between TOR switches 12, but the structured rearranged network 20 does not need a large number of low-granularity ports, and the TOR ports can be combined into Port Aggregation Groups (PAG) for optical link efficiency. PAGs can be used in place of the port in the above renditions of the structured rearranged network 20 implementation, resulting in multi-fiber cables assuming the role of single fiber in the previous rendition of structured rearranged network 20 from now on.

For example, again assume each TOR switch 12 has 64 ports with 16 ports facing servers and N=48 ports facing other TOR switches 12 in the network 20. Based on the structural constraint #1 described herein, the best performance in the network 20 is when all N=48 ports are connected to different neighbor TOR switches 12, thus forming a dense spider web of interconnects. While this dense spider web provides the best performance, it requires individual fibers and transceivers. The individual fibers require a significant amount of cables to realize the dense spider web and the transceivers have a low level of granularity—only one port per transceiver.

To address these deficiencies, the PAGs group several ports together, such as via a fiber bundle or via Wavelength Division Multiplexing (WDM). For example, 3 ports can be grouped such that there are now only 16 groups instead of N=48 for realizing the dense spider web. Thus, instead of a 48 fiber and transceiver fan out from the TOR switch 12, there is now a 16 PAG fan out which can also include a single transceiver with multiple wavelengths or the like. Thus, in this example, the fan out is reduced by a factor of three, leading to a more manageable deployment. Note, other PAG groupings are also possible such as 4, 5, 6, or more ports. While the single port to neighbor interconnect provides the optimal performance in the network 20, it was determined that the PAG implementation leads to a negligible performance degradation that is far outweighed by the associated operational efficiencies.

Of note, the examples herein are with an even number of TOR switches 12 and with fully populated networks. In cases when a number of TOR switches 12 is odd, one connection that would normally contain a TOR switch 12 can be simply replaced with an optical patch cord connection. Similarly, in cases where the data center is not fully built out with racks and TOR switches 12, there will be empty ports on the optical reshufflers 30. The cost of these extra ports is negligible (just a patch panel), and these can be looped back with front-panel optical cables to complete optical connections as needed (i.e., replace missing TOR switches 12 with a patch cord).

The network 20 in practice will evolve from an initial fill of TOR switches 12 to a full fill of TOR switches 12. For example, assume the initial fill of TOR switches 12 includes 256 switches and the full fill includes 4096 switches. Thus, initially, the network 20 will be deployed with a small subset of TOR switches 12, but with a full complement of the optical reshufflers 30 to support the expected fill, e.g., 4096 switches. Again, the optical reshufflers 30 can be partitioned in two levels. In a first level, there are separate optical reshufflers 30 labeled 1, 2, 3, 4, etc. such as in FIGS. 6 and 7. In a second level, each of the separate reshufflers 30 can be further partitioned into chunks, such as the Left ("L") and Right ("R") in FIG. 7. Of note, each of the separate reshufflers 30 can be partitioned in more than just two chunks (L and R).

Thus, at the low fill, the entire complement of the optical reshufflers 30 is deployed to support the full fill. However, a single chunk is only required across each of the optical reshufflers 30 at the low fill. Deployment of the entire complement of the optical reshufflers 30 does not significantly impact the network 20 since the optical reshufflers 30 are passive devices (no power consumption) and relatively low cost (compared to the TOR switches 12). The additional chunks are filled as the number of TOR switches 12 scale.

At less than full fill, there are gaps in the dense web at the optical reshufflers 30. As described herein, these gaps at the optical reshufflers 30 in the chunks can be addressed at low fill by shorting the connection at the optical reshufflers 30 with a cable, i.e., jumper the input connector to the output connector so that this gap is optically bridged. This approach creates connectivity in the dense web by bypassing non-existent TOR switches 12 in these gaps. Note, these bridged gaps can lead to the structural constraint #1 being violated at low fills. However, as TOR switches 12 are added, they are filling in these bridged gaps in addition to adding the unused chunks of the optical reshufflers 30. For example, in a full fill network assume a TOR#1 is connected to a TOR#3000 which is connected to a TOR#2 and the TOR#1 is connected to a TOR#4000 which is connected to the TOR#2. Now, at low fill, the TOR#3000 and the TOR#4000 are omitted and the TOR#1 and TOR#2 are connected to one another twice, due to the gaps that are bridged.

Latency

Figure 8:
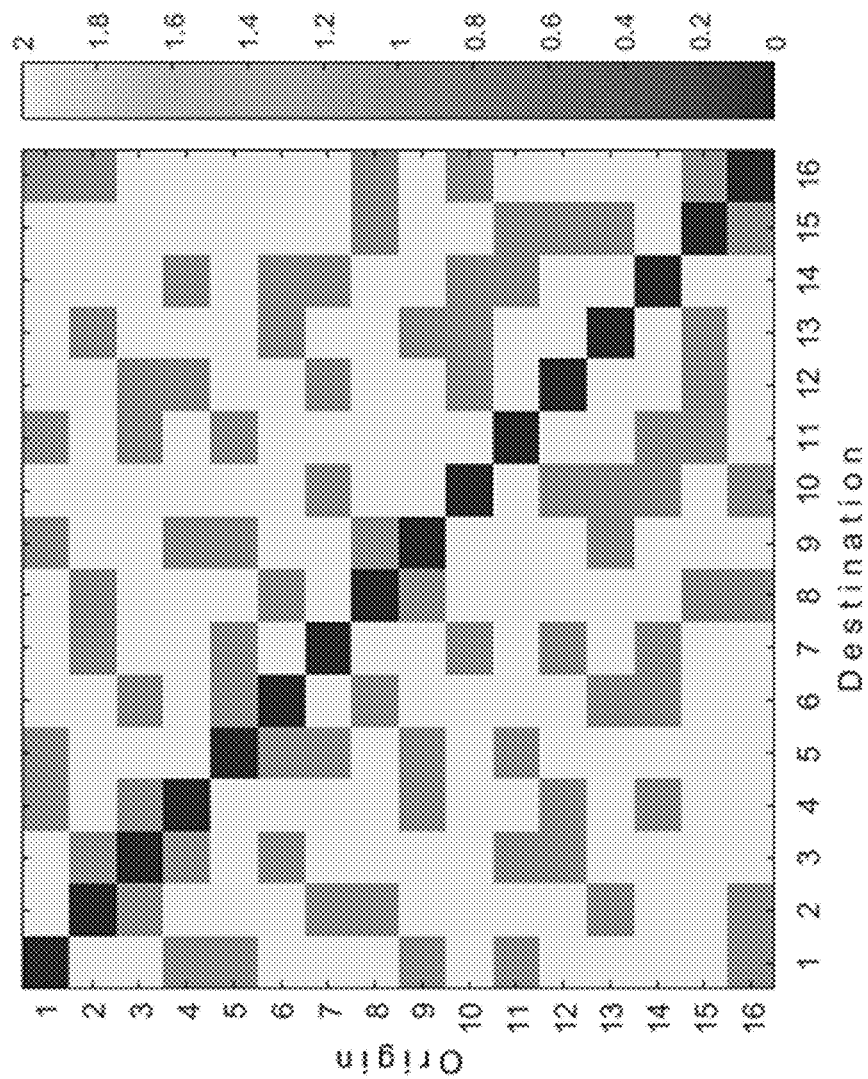
FIG. 8 is a graph of gray-scale coded latencies (in number of hops) of transmission of an origin TOR switch to a destination TOR switch in the structured rearranged network in FIG. 2.
Figure 9:
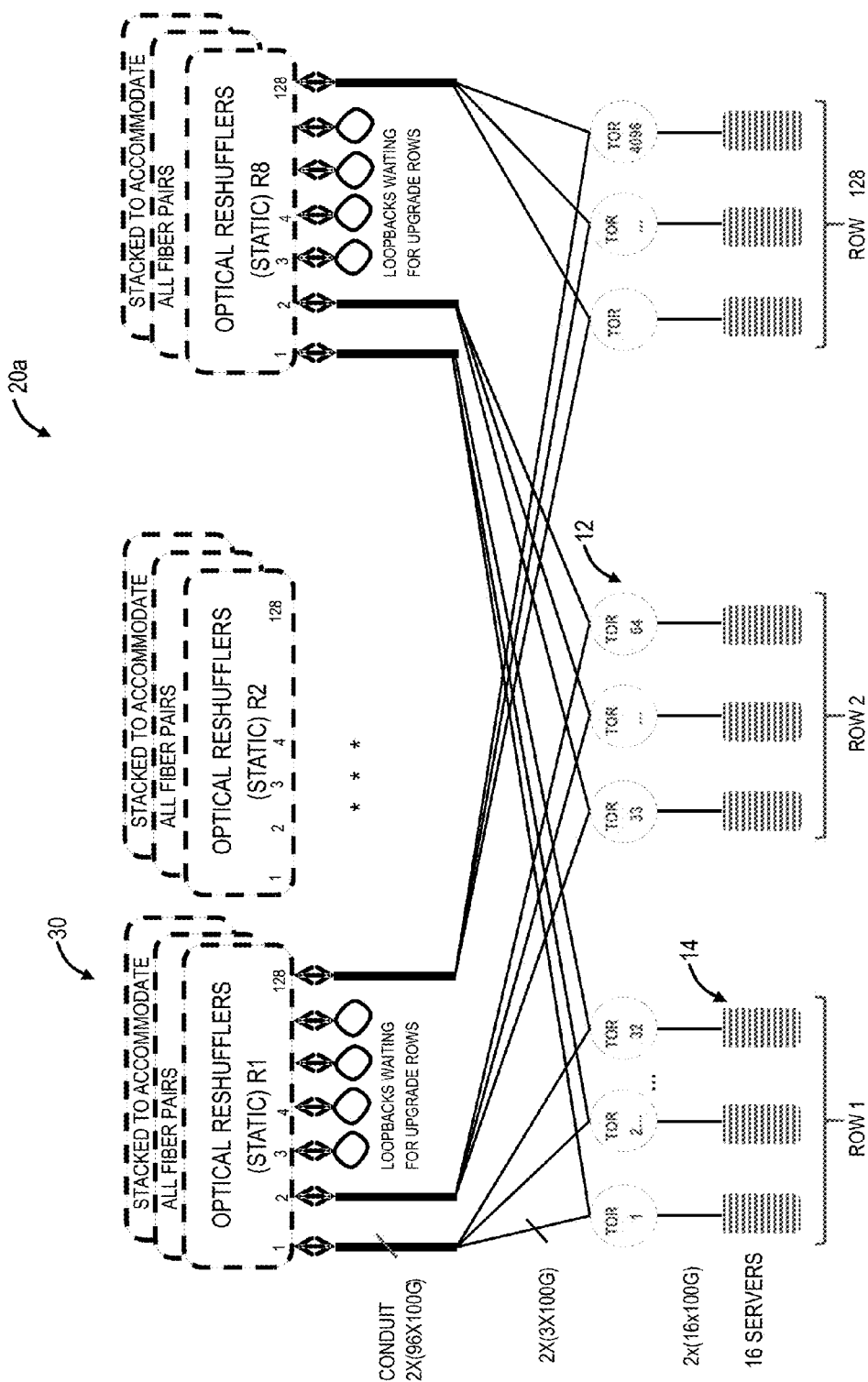
FIG. 9 is a network diagram of a structured rearranged network with a plurality of servers interconnected via a plurality of TOR switches interconnected as described herein with the optical reshufflers.

Referring to FIG. 8, in an exemplary embodiment, a graph illustrates gray scale coded latencies (in a number of hops) of transmission of an origin TOR switch 12 to a destination TOR switch 12 in the structured rearranged network 20 in FIG. 2. A data center network's efficiency is mainly characterized by its latency and throughput. An ideal network with ultimate latency of just one hop and 100% throughput would be an All-to-All connected one. It is indeed too ideal to be truly realizable because it requires as many ports as there are TOR switches 12 to be interconnected. The 16 TOR switch 12 uniform random network in the structured rearranged network 20 in FIG. 2 achieves an optimal compromise with just five ports instead of 15. It may be envisioned as an All-to-Few connected network, which is obtained from the All-to-All connected one by strategically removing the extra connections, while maximally preserving its benefits. Thus, gray scale coded latencies (in a number of hops) corresponding the structured rearranged network 20 in FIG. 2 are shown in FIG. 9 below. As it is seen, maximum latency is two, just one hop more than ultimate minimum of one.

Comparison of the Structured Rearranged Network to a Clos Network

Referring to FIG. 9, in an exemplary embodiment, a network diagram illustrates a structured rearranged network 20b with a plurality of servers 14 interconnected via a plurality of TOR switches 12 interconnected as described herein with the optical reshufflers 30. In FIG. 9, the structured rearranged network 20b includes 8 layers of optical reshufflers 30. The 8 layers are for spatial separation for failure decorrelation and for manufacturing and operation efficiency. Note that the concept of further separating each reshuffle 30 into L and R components is NOT illustrated on this drawing for clarity. Each optical reshuffler 30 in FIG. 9 includes 128 port groups, equivalent to the number of rows of TOR switches 12 and servers 14. The TOR switches 14 each includes, for example, 64 ports which are assigned to 16 server ports and 48 network ports. Again, the optical reshufflers 30 are all optical and static (no switching—switching is performed by each of the TOR switches 12). The 48 network ports can be partitioned into 3×PAG bundles and 2 bundles per reshuffle (2*3*8=48).

Figure 1:
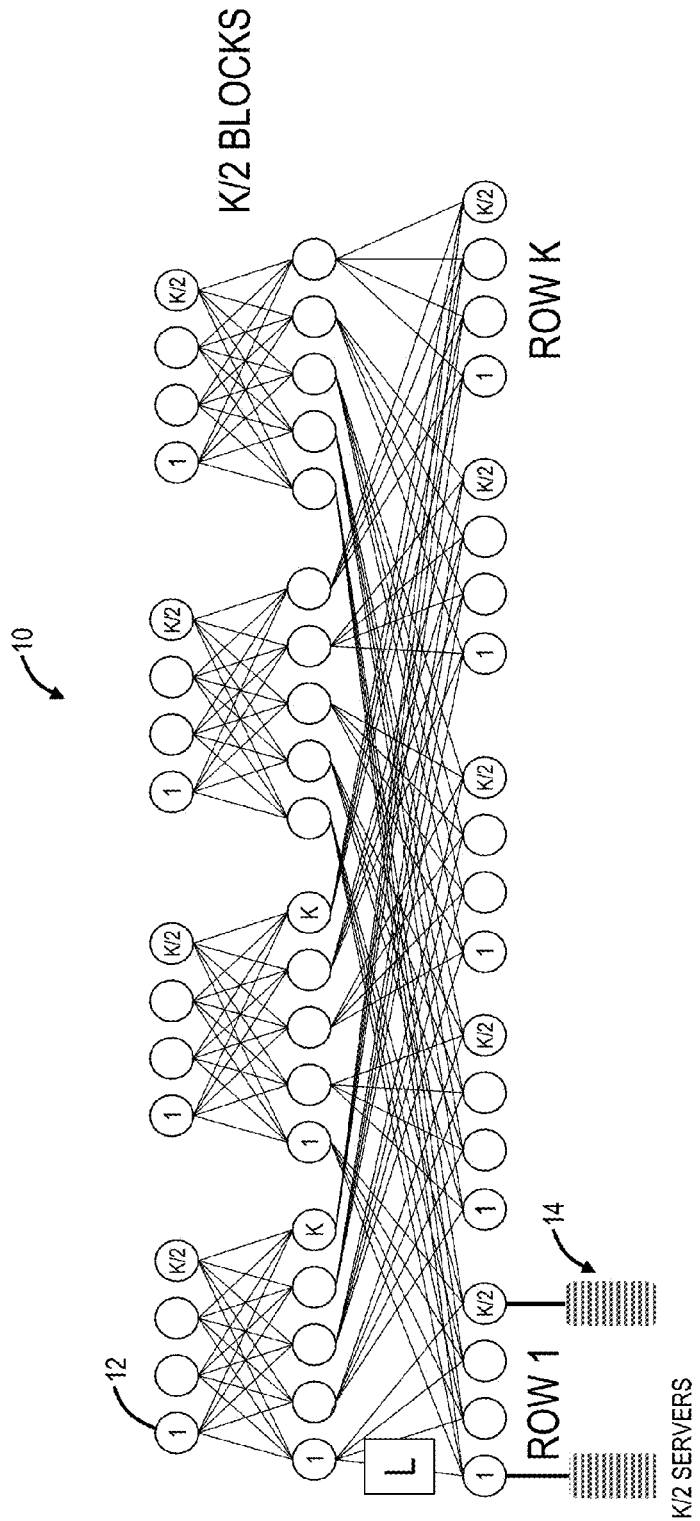
FIG. 1 is a network diagram of an exemplary three-layer leaf-spine folded-Clos network with various switches interconnecting servers.

The structured rearranged network 20b is compared relative to a traditional three-layer Clos such as in the Clos network 10. Assume a switching ASIC with k=64 ports. This immediately determines a fully populated 3-layer folded Clos architecture, shown in FIG. 1, with 65536 total servers, 5120 total switch ASICs, and ~131K interconnect links. The structured rearranged network 20b is a much more flexible design, and the design in FIG. 9 is selected to support an identical number of servers (65536). There are 16 ports per switch ASIC allocated to the servers 14, with the remaining 48 ports (out of k=64) allocated to network connectivity. Therefore, the structured rearranged network 20b requires 4096 TOR switches 12, and ~98K interconnect links resulting in approximately 20% savings in ASICs (4096 instead of 5120) and 25% savings in interconnects (~98K instead of ~131K).

Simulations were done comparing the throughput between the structured rearranged network 20b and the Clos network 10 for various traffic patterns. A first traffic pattern was for the longest match where network throughput was modeled using a longest match traffic load which is the industry accepted worst case, i.e., choosing connections between TOR switches 12 with maximum latency. The structured rearranged network 20b shows ~70% higher network throughput at ~20% lower network cost (in power and capital expense) relative to the Clos network 10. The resilience of the structured rearranged network 20b to the failure of up to 25% of random optical links was much better than the Clos network 10, with graceful degradation. Resilience to TOR switch 12 failures is somewhat difficult to compare directly. The structured rearranged network 20b effectively loses servers 14 connected to the failed TOR switch 12. Compute capability goes down, but overall network performance actually improves due to corresponding load reduction. The Clos network 10 loses servers 14 if the failed TOR switch 12 is at the bottom layer. The Clos network 10, in turn, loses network throughput if failed switches are at higher layers, but compute capability stays fixed.

A second traffic pattern was for clustered traffic. For clustered traffic, the structured rearranged network 20b provides ~60% higher throughput and at lower hardware cost, compared to the Clos network 10. The clustered traffic in the Clos network 10 is constrained to 2nd-level only (i.e., never goes to higher Clos levels). It should be noted that clustered traffic creates some reliability problems in the Clos network 10. If a job is restricted to a physical cluster and that area of the data center fails, the job is completely lost. For jobs that require high levels of reliability, data center operators often start the same job on different clusters for redundancy. The same problem does not exist in structured rearranged network 20b architecture—there are no set failure domains.

A third traffic pattern was for clustered traffic with 3:1 Statistical Multiplexing, i.e., bandwidth reduction as traffic moves up Clos layers. In this scenario, the structured rearranged network 20b shows substantial throughput increase at fixed capital expense as well. A fourth traffic pattern was for a longest match with link and ASIC failures (up to 25%). Here, network resilience to failures is analyzed in both links and ASICs. The structured rearranged network 20b shows a graceful degradation in network throughput, as is consistent with the fact that it provides very rich internal connectivity among TOR switches 12. A 25% link failure leads to a sub-linear 20% reduction in network throughput. Of course, higher failure rates will progressively increase penalty, too. In contrast, the Close network 10 leads to a drastic reduction in throughput. Depending on the location of failures, a 25% link failure leads to 40-50% throughput reduction, and as much as 80% reduction in some cases.

Figure 10:
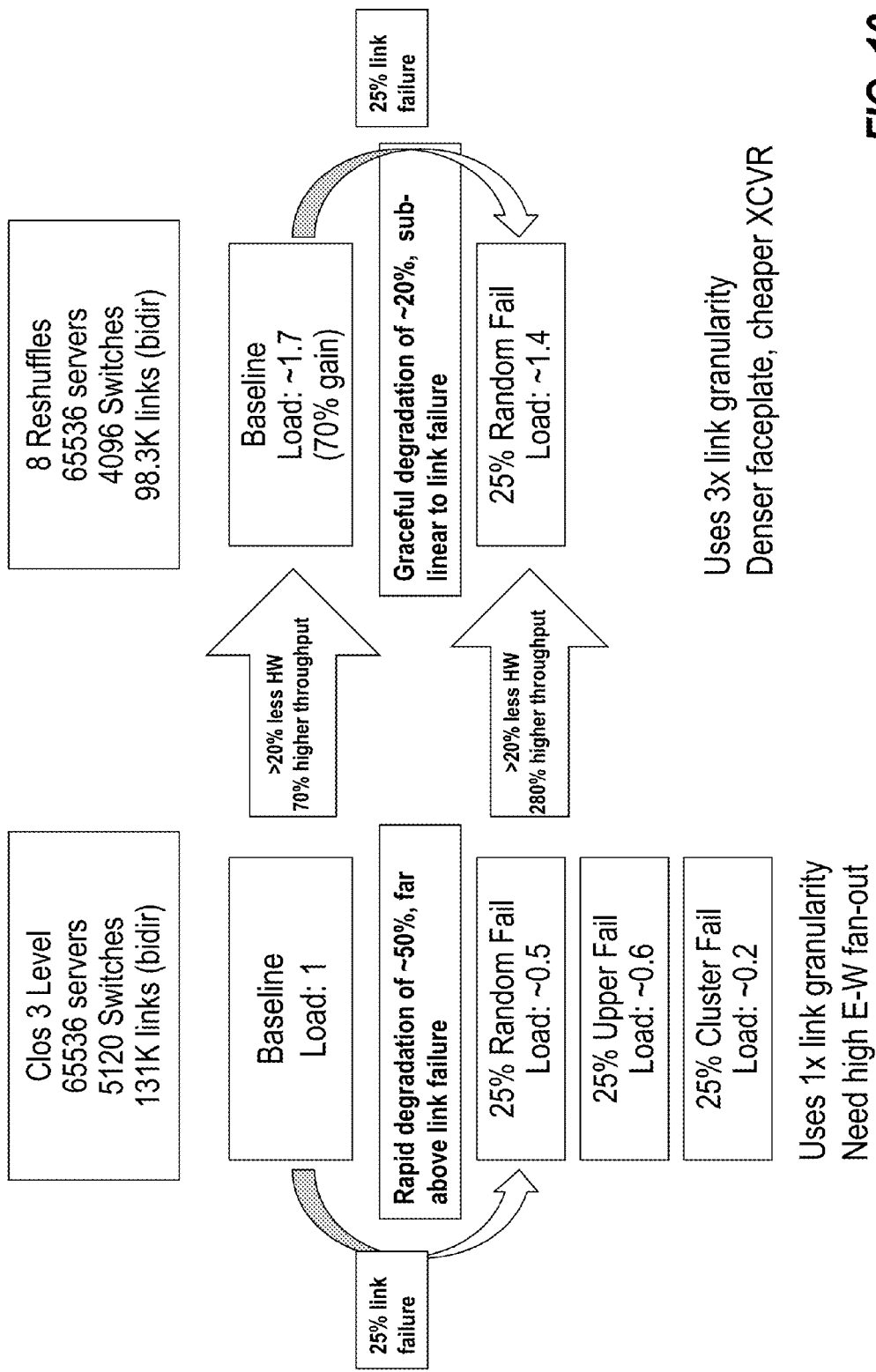
FIG. 10 is a visualization of the comparison between the structured rearranged network of FIG. 9 relative to the Clos network of FIG. 1.

The foregoing table illustrates the comparison and FIG. 10 illustrates a visualization of the comparison:

| Parameter | Clos (Fat Tree) | STRAT |
| --- | --- | --- |
| High throughput | 1 x | 1.7 x |
| High link utilization | Yes | Yes |
| Latency (i.e. hops) | 1 x | 1/2 x |
| Traffic pattern support | Prefers clustering | Do not need clustering |
| Survivability | Yes | Yes |
| Extendibility | Structured, hard to grow gracefully | Easy, but still requires matching ports |
| Routing Simplicity | Yes | Yes, less structured |
| Support for heterogeneity (tech evolution) | Hard to insert new technology (1 port count switches) | Easy to insert new technology |
| Maintainability | Structure makes it relatively easy | Visualization and Recordkeeping solved through software |
| Optical Link Count | 1 x | ~0.75 x |

Figure 11:
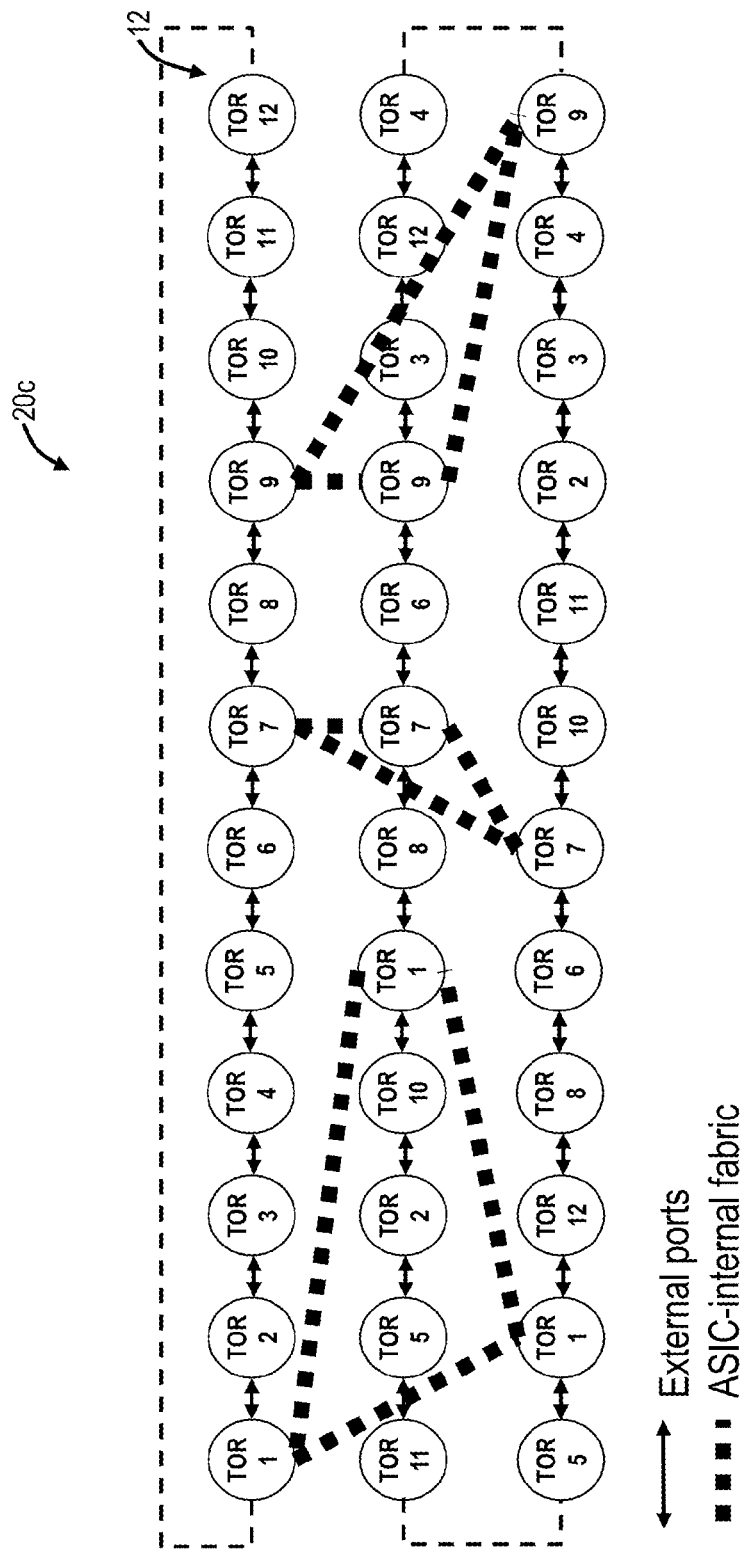
FIG. 11 is a logical diagram of a visualization of a structured rearranged network.

Referring to FIG. 11, in an exemplary embodiment, a logical diagram illustrates a visualization of a structured rearranged network 20c. Note, the structured rearranged network 20c is shown based on its local topology. The structured rearranged network 20c has external port connectivity and internal ASIC fabric connectivity. The structured rearranged network 20c can be conceptualized as similar to the chutes and ladders board game. Here, the external ports represent adjacent switch 12 connectivity whereas the internal ASIC fabric connectivity represents the chutes or ladders.

TOR Switches and Management

Figure 12:
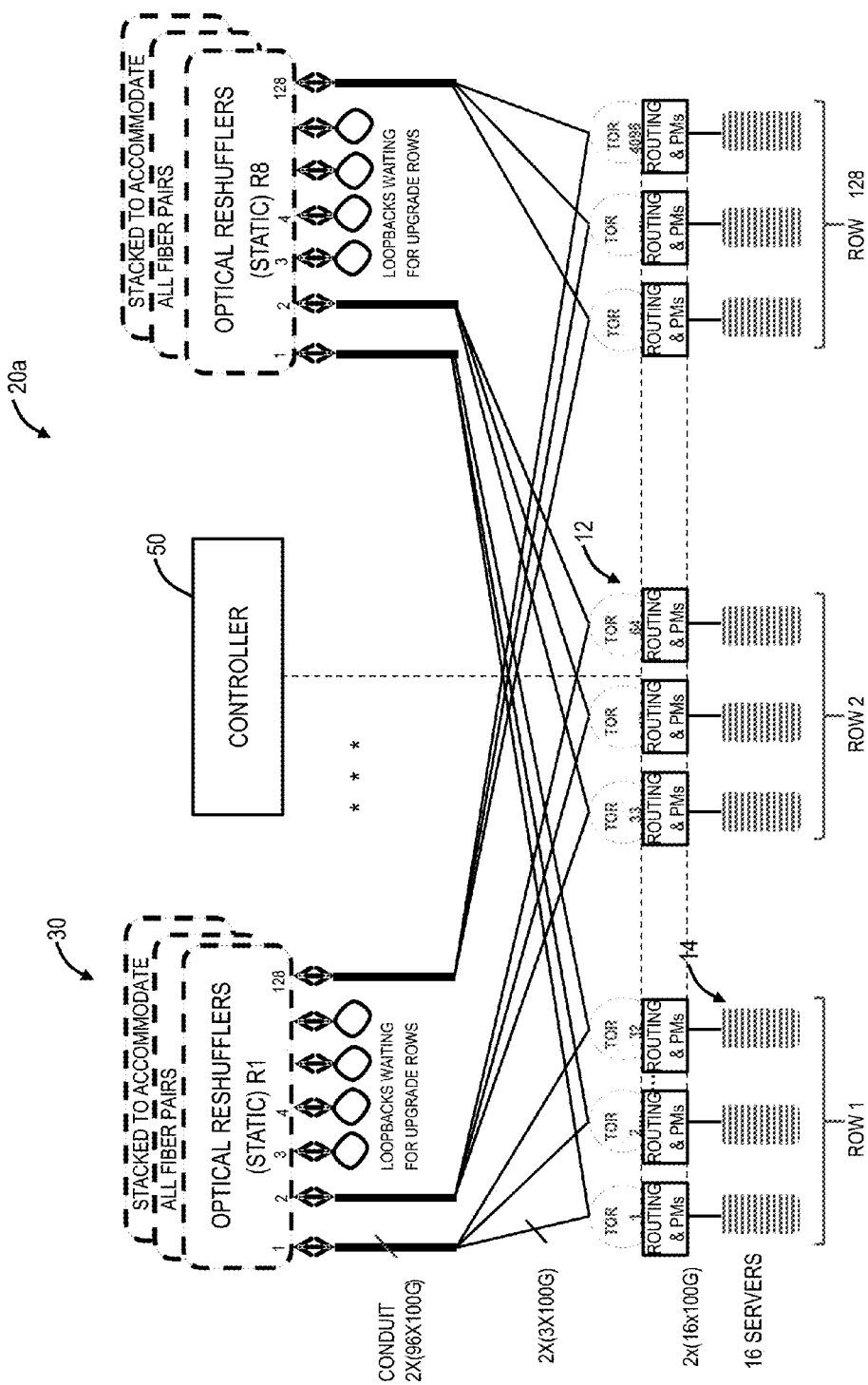
FIG. 12 is a network diagram of the structured rearranged network with management thereof using a controller.

Referring to FIG. 12, in an exemplary embodiment, a network diagram illustrates the structured rearranged network 20a with management thereof using a controller 50. In an exemplary embodiment, the controller 50 can be a Network Management System (NMS), Element Management System (EMS), Software Defined Networking (SDN) controller, a server executing an SDN application, or the like. Generally, the controllers 50 is a processing device configured to perform Operations, Administration, Maintenance, and Provisioning (OAM&P) functionality associated with the structured rearranged network 20, including controlling routing of the TOR switches 12 and performance monitoring thereof. The TOR switches 12 could and most likely come from different vendors, but each includes full standard compliant Ethernet interfaces. Functions like load balancing, address translation, Distributed Denial of Service (DDoS) monitors, in-band telemetry and debug metrics can be programmed into the infrastructure by the controller 50.

The structured rearranged network 20a is topology controlled and programmed, and with the complete network connectivity known, software-based visualization is possible through the controller 50. In a centralized approach, the best paths can be calculated from each server 14 to every other server 14; for each TOR switch 12, the controller 50 can determine the next hop for every other server 14; and the controller 50 can push the forwarding table to each TOR switch 12, such as via SDN mechanisms. In a distributed approach, a Border Gateway Protocol (BGP)-like algorithm can be used to build a forwarding table, and failures can be dealt with locally. In a hybrid approach (a combination of the centralized and distributed approach), this can start with the centralized approach and use the distributed approach for updates and failures. The controller 50 can override (re-program) tables and failures can be dealt with locally until the centralized update is performed.

Clos Upgrade to STRAT

Figure 13:
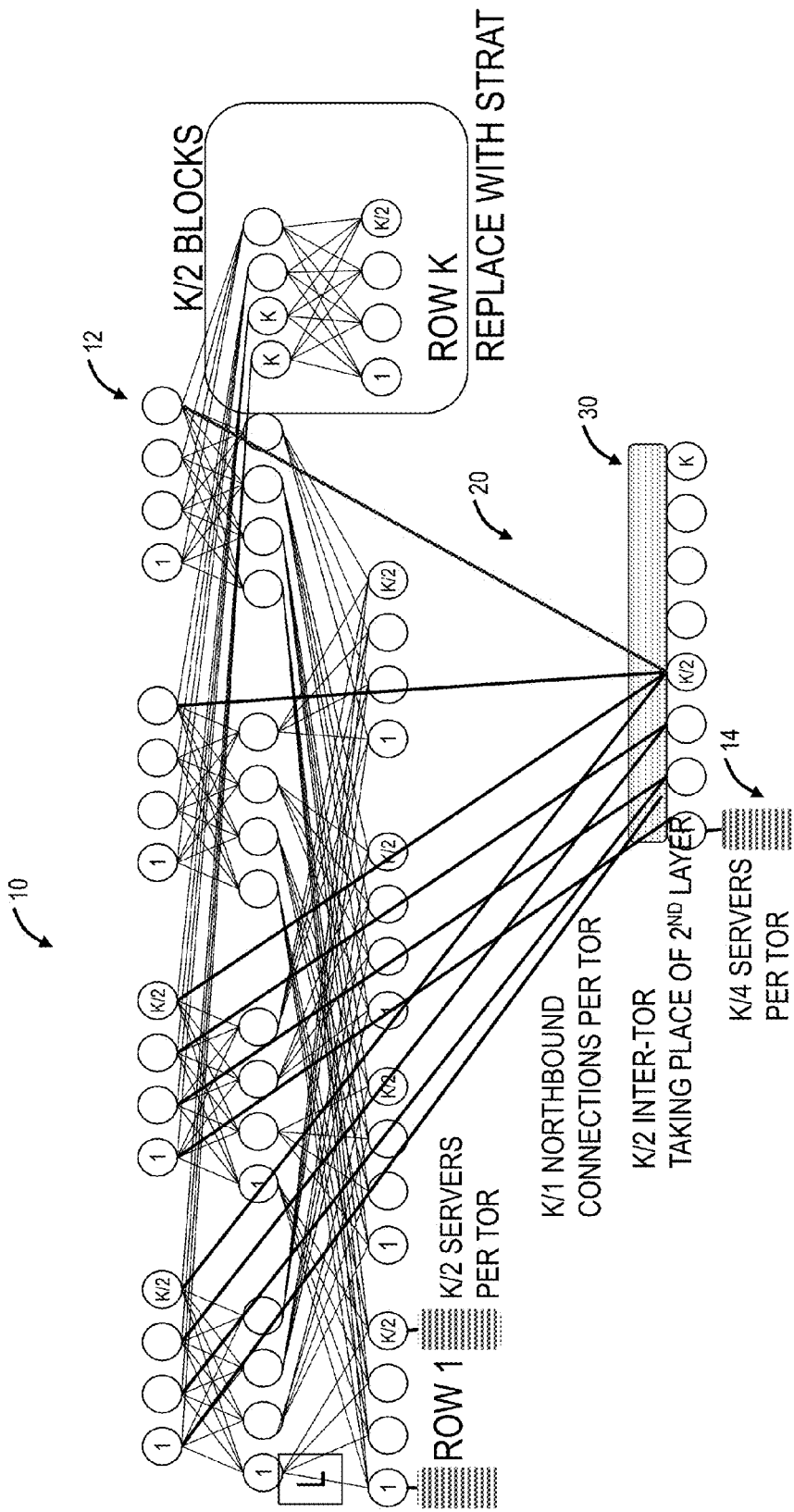
FIG. 13 is a network diagram of a mechanism to upgrade the Clos network of FIG. 1 to the structured rearranged network (STRAT)

Referring to FIG. 13, in an exemplary embodiment, a network diagram illustrates a mechanism to upgrade the Clos network 10 to the structured rearranged network (STRAT) 20. Again, the Clos network 10 includes k rows with each TOR switch 12 having k ports and the Clos having three layers, L=3. Each of the k rows includes k/2 servers 14 per TOR switch 12. To upgrade the Clos network 10 to the structured rearranged network 20, row k is replaced with the optical reshuffler 30 with k/2 TOR switches in row k taking the place of the second layer in the Clos network 10 and with k/4 servers 14 per TOR switch 12.

STRAT WAN Interface

Figure 14:
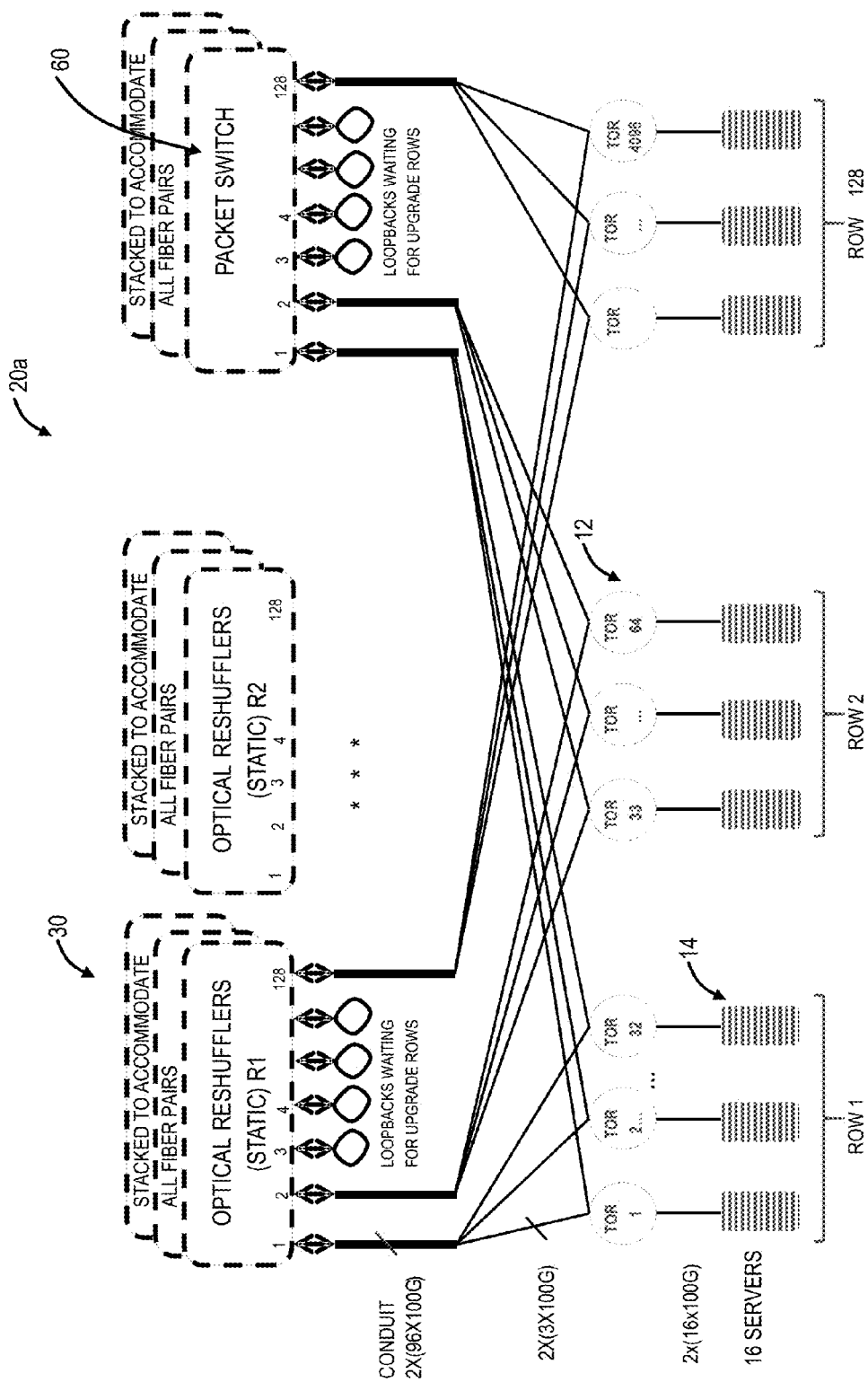
FIG. 14 is a network diagram of the structured rearranged network with a Wide Area Network (WAN) via a packet switch.

Referring to FIG. 14, in an exemplary embodiment, a network diagram illustrates the structured rearranged network 20a with a Wide Area Network (WAN) via a packet switch 60. Here, one of the optical reshufflers 30 is replaced with the packet switch 60. Here, each TOR switch 12 can connect to the packet switch 60. Alternatively, a WAN interface can be provided from a fraction of the TOR switches 12 by replacing one of the sets of rows of TOR switches 12 with the packet switch 60.

Optical Reshuffler

Figure 15:
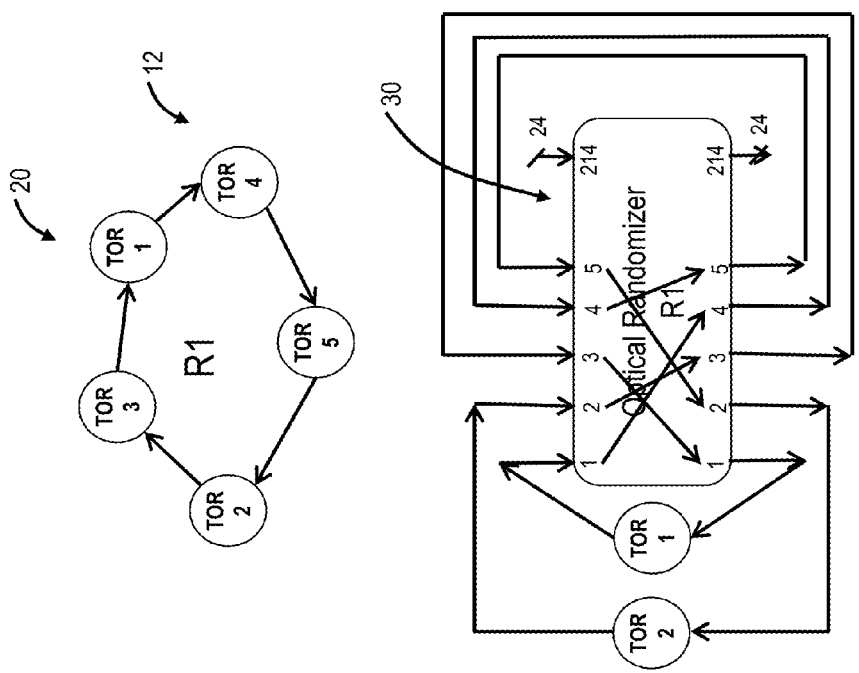
FIG. 15 is a block diagram of concepts associated with the optical reshuffler for randomization.

Referring to FIG. 15, in an exemplary embodiment, a block diagram illustrates concepts associated with the optical reshuffler 30 for randomization. Again, the optical reshuffler 30 can be a rack-mounted module which includes a plurality of physical ports 32 and internal connectivity 34 inside the module to optically connect the plurality of physical ports 32. For example, the optical reshuffler 30 can be a 4RU module with 6×12 MPO optical ports (96). In a full-fill configuration, each port 32 connects a TOR switch 12 to another TOR switch 12 completing the random graph network described herein. From a management and operations perspective, the optical reshufflers 30 advantageously remove the fiber cabling complexities and enforce proper randomization in the topology. However, in operation, the structured rearranged network 20 will gradually grow to full-fill. Here, each TOR switch 12 added is connected to a port 32. Unequipped ports can be optically shorted to complete the ring shown in the top portion of FIG. 16 or open if not needed to complete the ring.

Filling up the optical reshuffler 30 can be based on port rules. The port rules ensure that the random topology is enforced and that an added TOR switch 12 is connected through the optical reshuffler 30. The port rules can include which of the ports should be optically shorted, i.e., looped back on themselves, or which should be open based on which ports are connected to TOR switches 12.

Referring to FIG. 16, in an exemplary embodiment, a diagram illustrates a matrix of block of sequential set of TOR switches 12. The 8 optical reshufflers 30 operate by partitioning the randomly interconnected structured rearranged network 20 into 8 domains. Each reshuffler 30 is also split into 4 sub-reshufflers—these correspond to L and R sub-reshufflers of FIG. 7. Further, the TOR switches 12 are partitioned into smaller blocks, e.g., 256 TOR switches 12 per block. The blocks are numbered for 1, 2, . . . , 16 for a total of 4096 TOR switches. Blocks are connected to each reshuffler 30 in a different order to create a rich path of connectivity among blocks and TOR switches 12. The reshuffles 30 can be identical or distinct, depending on the desired statistics of interconnection and manufacturing simplicity.

The optical reshufflers 30 provide structured interconnect randomization. Thus, a data center network can utilize a single layer architecture. The data center network can include a plurality of switches each with k ports comprising n network facing ports and m server facing ports, k, m, n are each integers; and a plurality of optical reshufflers configured to randomly interconnect the plurality of switches via the n network facing ports of each in a single layer, unstructured network based on a plurality of structural constraints, as described herein. The optical reshufflers 30 preserve the aforementioned advantages of a random network but introduce some structure into the architecture. Each optical reshuffler 30 can also be spatially independent, which improves data center resilience to catastrophic breakdowns. The optical reshufflers 30 can be partitioned as described herein into sub-reshufflers 30 for simplifying manufacturing, deployment and repairs. The TOR switches 12 can be grouped into blocks, rows, chains, etc. before providing them to the optical reshufflers 30.

Each TOR switch 12 port is associated with a specific optical reshuffler 30. The optical reshufflers 30 may be identical for the same port, but different among ports. In some cases, same optical reshuffler 30 design can be used for several ports, further simplifying manufacturing. The optical reshufflers 30 are organized and interconnected as described herein (meshing with each neighbor), which creates a rich interconnection of possibilities to transition from port to port.

The Clos network 10 is limited by the port count in East-West (horizontal) scaling. In contrast, the structured rearranged network 20, 20a allows high granularity ports, aggregating into high bandwidth bundles allowing use of lower cost optical transceiver and significant front panel density improvement. For external connectivity, a fractional number of the TOR switches 12 can be dedicated to external links with the TOR switches 12 participating in the structured rearranged network 20, 20a and server links connected externally. Further, the structured rearranged network 20, 20a supports a gradual upgrade from the Clos network 10.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A data center network utilizing a single layer architecture, the data center network comprising:
    a plurality of switches each with a plurality of ports comprising a first set of ports of the plurality of ports comprising network facing ports and a second set of ports of the plurality of ports comprising server facing ports; and
    a plurality of optical reshufflers configured to randomly interconnect the plurality of switches via the network facing ports of each in a single layer, unstructured network based on a plurality of structural constraints,
    wherein, at less than full fill of the plurality of optical reshufflers with associated switches connected thereto, unequipped ports on the plurality of optical reshufflers are cabled back on themselves to bridge a gap where a switch resides at a larger fill.

2. The data center network of claim 1, wherein a number of the network facing ports is equal or greater than a number of the server facing ports and wherein each of the plurality of switches is a switch with attached servers.

3. The data center network of claim 1, wherein the plurality of optical reshufflers are spatially partitioned across a layer with each optical reshuffler restricted to internal connectivity.

4. The data center network of claim 1, wherein the network facing ports for an associated number of hops, h, for reachability between the plurality of switches, #TOR, and with server throughput oversubscription s:1, is selected based on: $\#TOR \leq s*n*(n-1)^{(h-1)}$, n being a number of the network facing ports.

5. The data center network of claim 1, wherein the plurality of structural constraints comprise a group of ports of the network facing ports of a switch is only used to connect the switch to a neighbor such that two or more groups of ports are not used for the neighbor at full capacity.

6. The data center network of claim 1, wherein the plurality of structural constraints comprise, when making connections, preference is provided to a pair of switches with a worst reachability including yet unreached switches.

7. The data center network of claim 1, wherein the plurality of switches and the plurality of optical reshufflers are located in separate racks in a data center and groups of the plurality of switches are connected to the plurality of optical reshufflers via a structured multi-fiber cable.

8. The data center network of claim 1, further comprising:
    a Clos network comprising a plurality of switches in a layered structured, wherein the plurality of switches and the plurality of optical reshufflers are added in the Clos network for upgrade thereof.

9. The data center network of claim 1, further comprising:
    a packet switch for external Wide Area Network connectivity, wherein the packet switch replaces one of the plurality of optical reshufflers and a group of the plurality of switches.

10. The data center network of claim 1, wherein groups of the network facing ports are aggregated in Port Aggregation Groups which are routed together.

11. A data center network utilizing a single layer architecture, the data center network comprising:
    a plurality of switches each with a plurality of ports comprising a first set of ports of the plurality of ports comprising network facing ports and a second set of ports of the plurality of ports comprising server facing ports; and
    a plurality of optical reshufflers configured to randomly interconnect the plurality of switches via the network facing ports of each in a single layer, unstructured network based on a plurality of structural constraints,
    wherein the plurality of structural constraints comprise a group of ports of the network facing ports of a switch is only used to connect the switch to a neighbor such that two or more groups of ports are not used for the neighbor at full capacity.

12. The data center network of claim 11, wherein a number of the network facing ports is equal or greater than a number of the server facing ports and wherein each of the plurality of switches is a switch with attached servers.

13. The data center network of claim 11, wherein the plurality of optical reshufflers are spatially partitioned across a layer with each optical reshuffler restricted to internal connectivity.

14. The data center network of claim 11, wherein the plurality of structural constraints comprise, when making connections, preference is provided to a pair of switches with a worst reachability including yet unreached switches.

15. The data center network of claim 11, wherein the plurality of switches and the plurality of optical reshufflers are located in separate racks in a data center and groups of the plurality of switches are connected to the plurality of optical reshufflers via a structured multi-fiber cable.

16. The data center network of claim 11, further comprising:
    a Clos network comprising a plurality of switches in a layered structured, wherein the plurality of switches and the plurality of optical reshufflers are added in the Clos network for upgrade thereof.

17. The data center network of claim 11, further comprising:
a packet switch for external Wide Area Network connectivity, wherein the packet switch replaces one of the plurality of optical reshufflers and a group of the plurality of switches.

18. The data center network of claim 11, wherein groups of the network facing ports are aggregated in Port Aggregation Groups which are routed together.

19. A data center network utilizing a single layer architecture, the data center network comprising:
a plurality of switches each with a plurality of ports comprising a first set of ports of the plurality of ports comprising network facing ports and a second set of ports of the plurality of ports comprising server facing ports; and
a plurality of optical reshufflers configured to randomly interconnect the plurality of switches via the network facing ports of each in a single layer, unstructured network based on a plurality of structural constraints,
wherein the network facing ports for an associated number of hops, h, for reachability between the plurality of switches, #TOR, and with server throughput oversubscription s:1, is selected based on: $\#TOR < s*n*(n-1)^{(h-1)}$, n being a number of the network facing ports.

20. The data center network of claim 19, wherein a number of the network facing ports is equal or greater than a number of the server facing ports and wherein each of the plurality of switches is a switch with attached servers.

* * * * *